(12) United States Patent
Kawakami et al.

(10) Patent No.: US 11,082,748 B2
(45) Date of Patent: Aug. 3, 2021

(54) POST PROVIDING SERVER, POST PROVIDING PROGRAM, USER PROGRAM, POST PROVIDING SYSTEM, AND POST PROVIDING METHOD

(71) Applicant: DWANGO Co., Ltd., Tokyo (JP)

(72) Inventors: Nobuo Kawakami, Tokyo (JP); Hiroaki Saito, Tokyo (JP); Takashi Kojima, Tokyo (JP)

(73) Assignee: DWANGO CO., LTD.

( * ) Notice: Subject to any disclaimer, the term of this patent is extended or adjusted under 35 U.S.C. 154(b) by 0 days.

(21) Appl. No.: 16/648,999

(22) PCT Filed: Nov. 9, 2018

(86) PCT No.: PCT/JP2018/041625
§ 371 (c)(1),
(2) Date: Mar. 19, 2020

(87) PCT Pub. No.: WO2019/093463
PCT Pub. Date: May 16, 2019

(65) Prior Publication Data
US 2020/0252692 A1  Aug. 6, 2020

(30) Foreign Application Priority Data
Nov. 9, 2017 (JP) .............................. JP2017-216416

(51) Int. Cl.
*H04N 7/10* (2006.01)
*H04N 7/025* (2006.01)
(Continued)

(52) U.S. Cl.
CPC ..... *H04N 21/4788* (2013.01); *H04N 21/2187* (2013.01); *H04N 21/4882* (2013.01)

(58) Field of Classification Search
CPC .................. H04N 21/2187; H04N 21/4788
See application file for complete search history.

(56) References Cited

U.S. PATENT DOCUMENTS

| 10,231,024 B2 * | 3/2019 | Pinto ................ H04N 21/4756 |
| 2006/0034590 A1 * | 2/2006 | Teramoto ............ H04N 5/9206 386/247 |

(Continued)

FOREIGN PATENT DOCUMENTS

| CN | 105847932 A | 8/2016 |
| CN | 106210857 A | 12/2016 |

(Continued)

OTHER PUBLICATIONS

PCT/JP2018/041625 International Search Report dated Dec. 11, 2018, 1 pg.

*Primary Examiner* — Gigi L Dubasky
(74) *Attorney, Agent, or Firm* — Bracewell LLP; Douglas F. Stewart; Patrick J. Connolly

(57) ABSTRACT

It is an object of the present invention to provide a sense of togetherness to a user viewing content in which a plurality of targets appears. A post providing method comprises: a step in which a user terminal receives post data related to content data in which a plurality of targets appear from an input device and sends the post data to a post providing server; a step in which the post providing server receives the post data related to content data in which a plurality of targets appear from the user terminal; a step in which the post providing server sends post data to the user terminal; and a step in which the user terminal displays the post data received from the post providing server in a display format based on the target corresponding to the user of the user terminal among the plurality of targets.

8 Claims, 11 Drawing Sheets

(51) Int. Cl.
*H04N 21/4788* (2011.01)
*H04N 21/2187* (2011.01)
*H04N 21/488* (2011.01)

(56) References Cited

U.S. PATENT DOCUMENTS

| | | | | |
|---|---|---|---|---|
| 2008/0062318 A1* | 3/2008 | Ellis | ............... | H04N 21/485 |
| | | | | 348/564 |
| 2010/0080163 A1* | 4/2010 | Krishnamoorthi | .... | H04L 12/189 |
| | | | | 370/312 |
| 2012/0151347 A1* | 6/2012 | McClements, IV | ... | G11B 27/34 |
| | | | | 715/716 |
| 2014/0013241 A1* | 1/2014 | Brown | ............... | G06Q 30/0282 |
| | | | | 715/753 |
| 2014/0215512 A1* | 7/2014 | Maruyama | ....... | H04N 21/44008 |
| | | | | 725/34 |
| 2015/0081788 A1* | 3/2015 | Takuma | ................ | H04L 67/02 |
| | | | | 709/204 |
| 2016/0127675 A1* | 5/2016 | Ahn | ................ | H04N 21/42221 |
| | | | | 348/734 |

FOREIGN PATENT DOCUMENTS

| | | | |
|---|---|---|---|
| CN | 106792229 A | | 5/2017 |
| CN | 106792230 A | | 5/2017 |
| JP | 2004177712 A | | 6/2004 |
| JP | 2011118730 A | | 6/2011 |
| JP | 201259162 A | | 3/2012 |
| JP | 2013005311 A | | 1/2013 |
| JP | 5638325 B2 | | 12/2014 |
| JP | 2017163535 A | | 9/2017 |

\* cited by examiner

[FIG. 1]
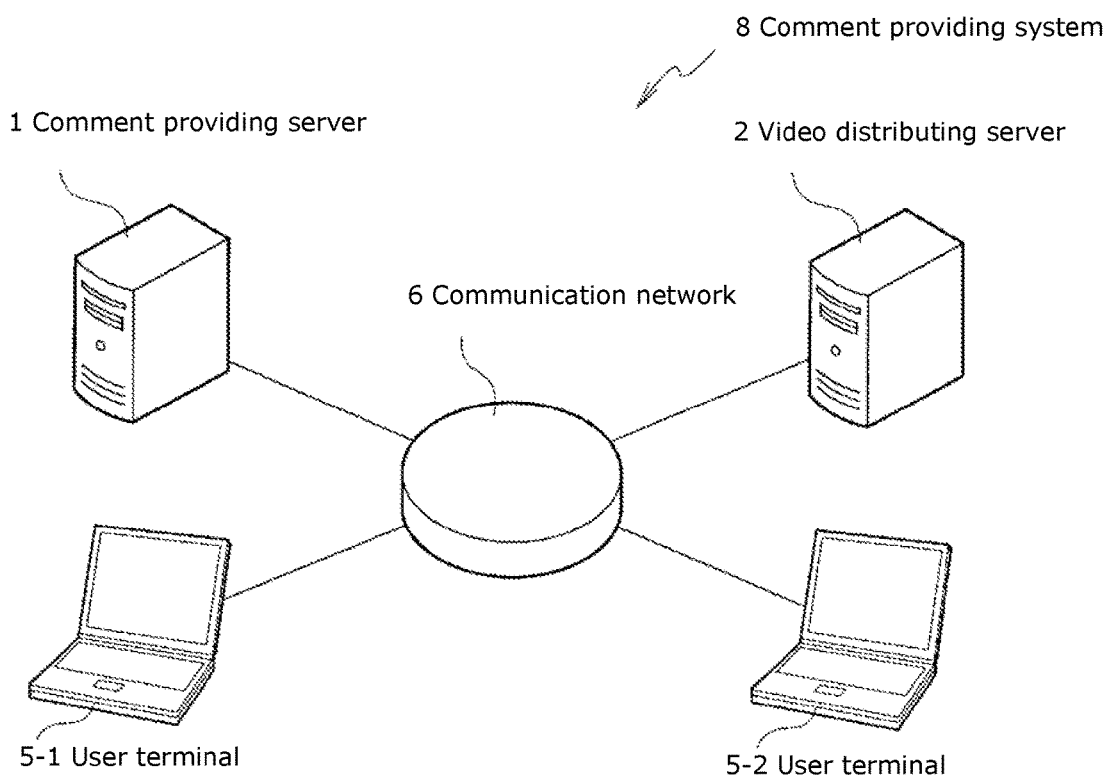

[FIG. 2]
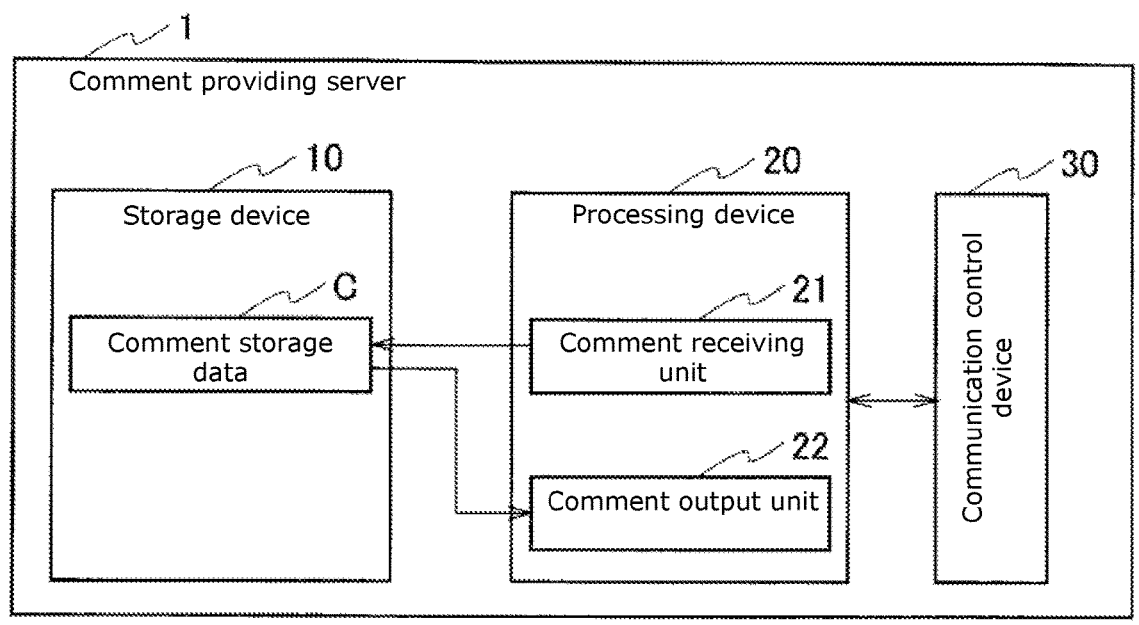
[FIG. 3]
C Comment storage data
| Comment Identifier | Time | Comment Details | User Support Target |
|---|---|---|---|
| CO_XX | XXXX | XXXXXX | TA_A |
| CO_XX | XXXX | XXXXXX | TA_B |
| .... | .... | .... | .... |

[FIG. 4]
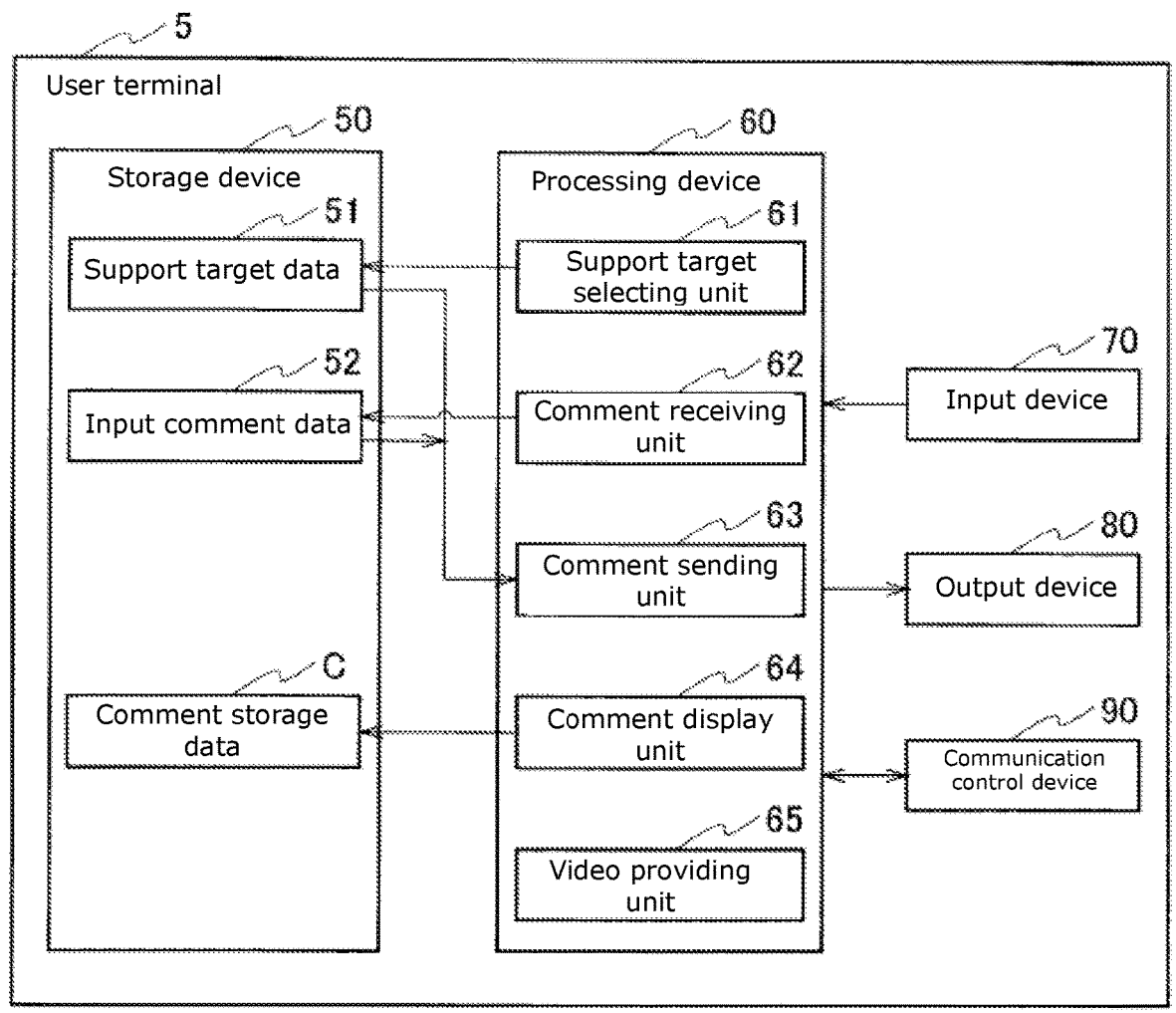

[FIG. 5]
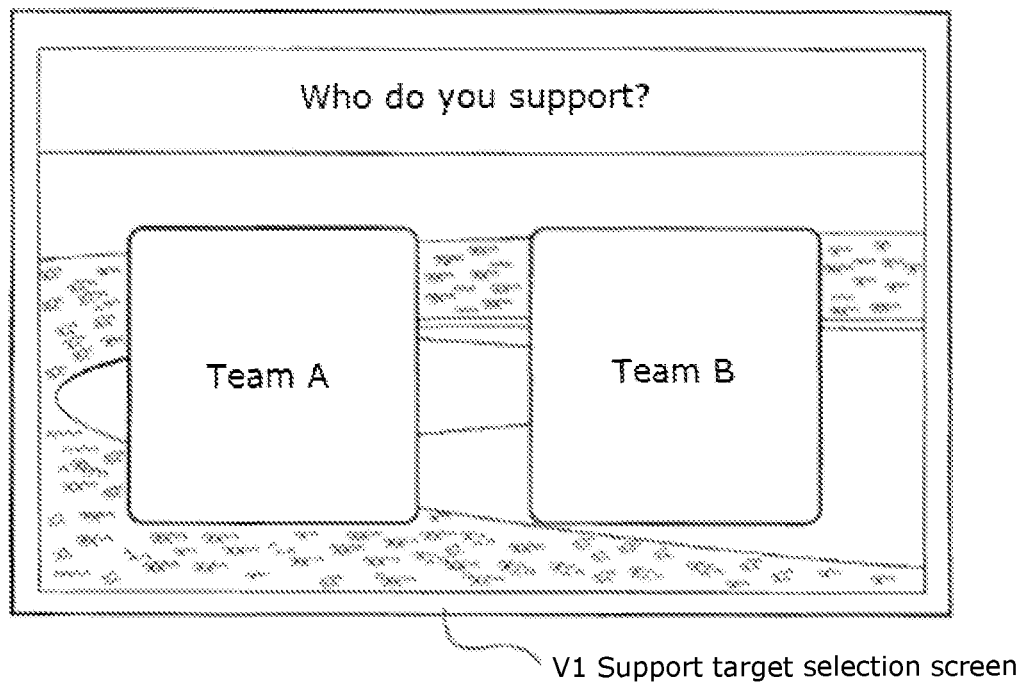

[FIG. 6]
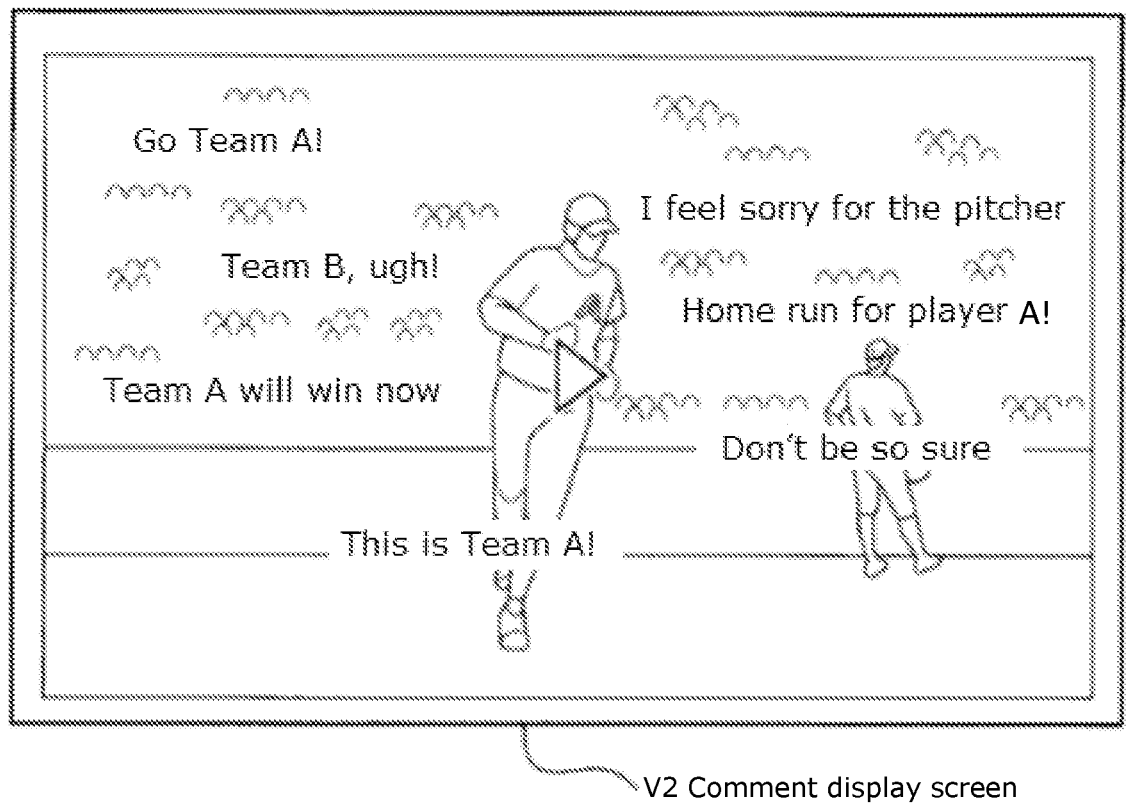

[FIG. 7]
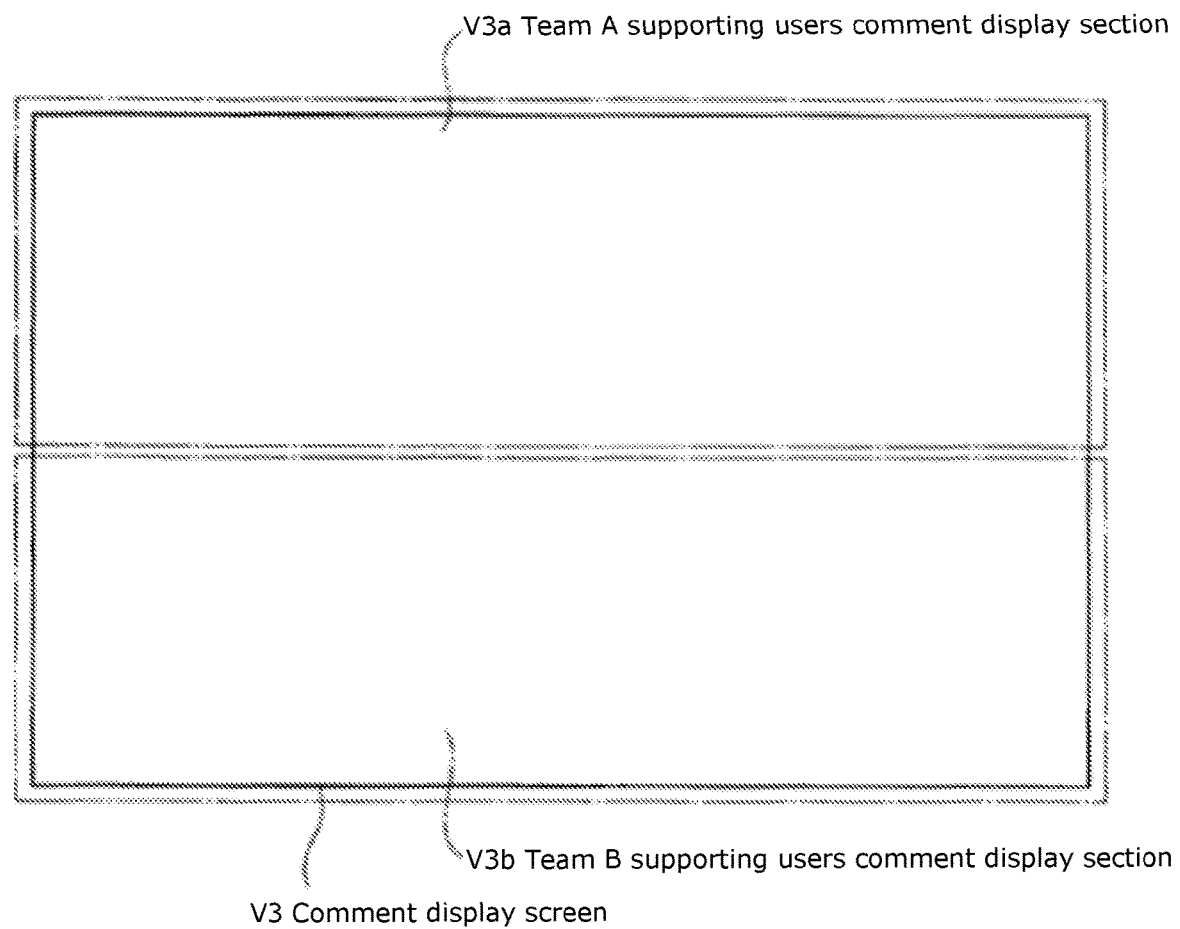

[FIG. 8]
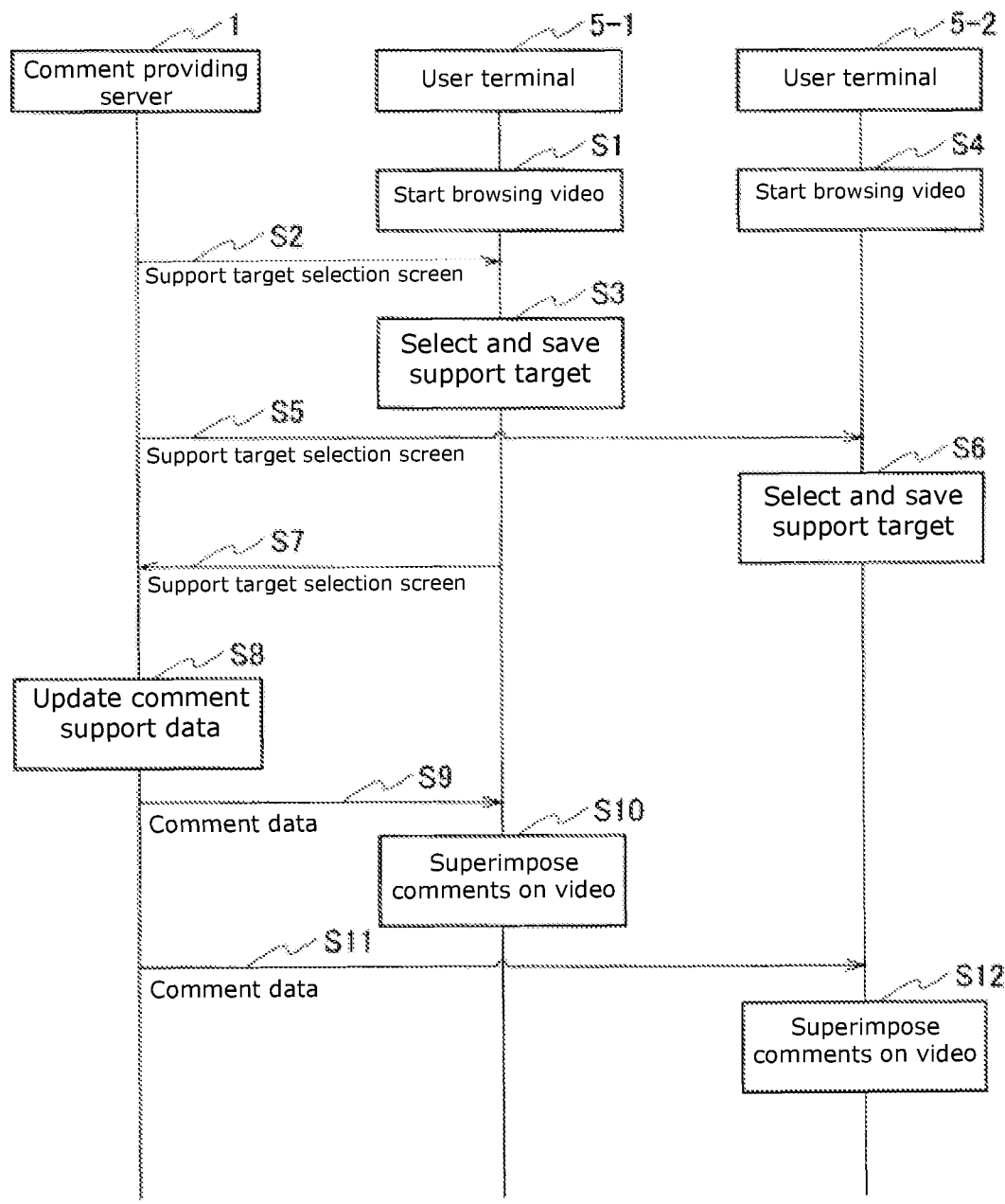

[FIG. 9]
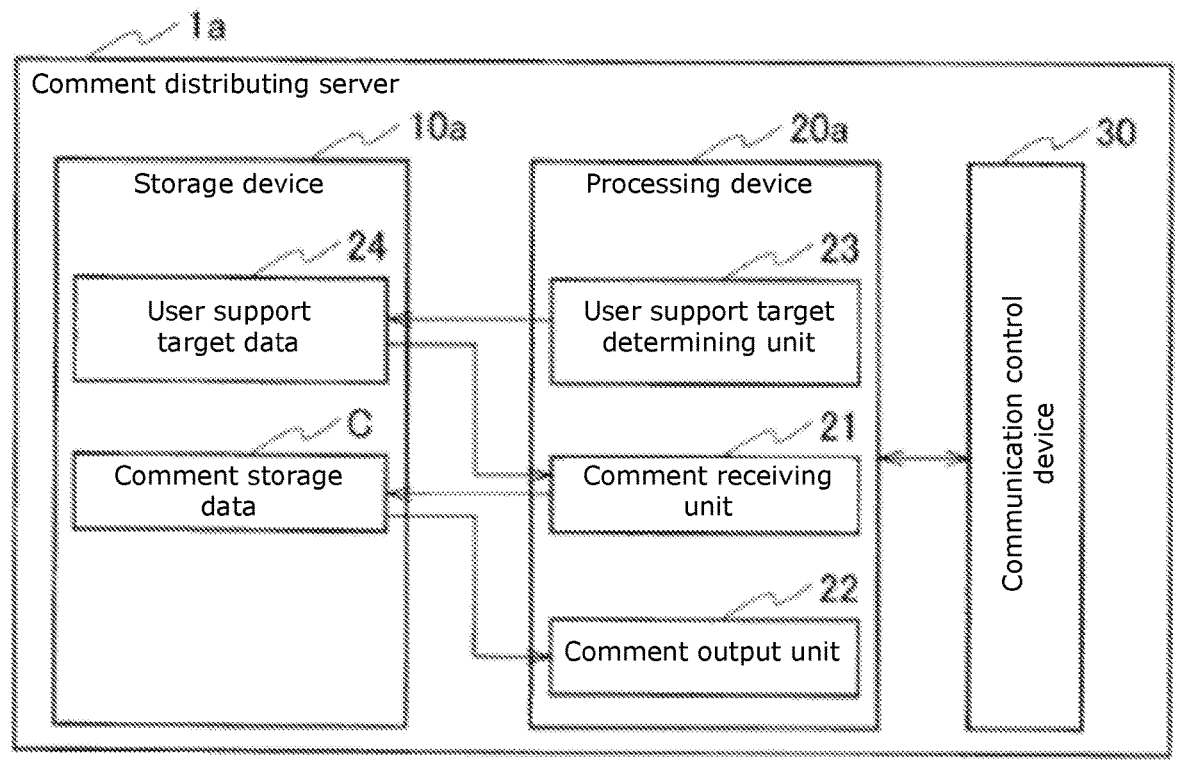
[FIG. 10]
24 User support target data
| User Identifier | User Support Target |
|---|---|
| U_XX | TA_A |
| U_XX | TA_B |
| .... | .... |

[FIG. 11]
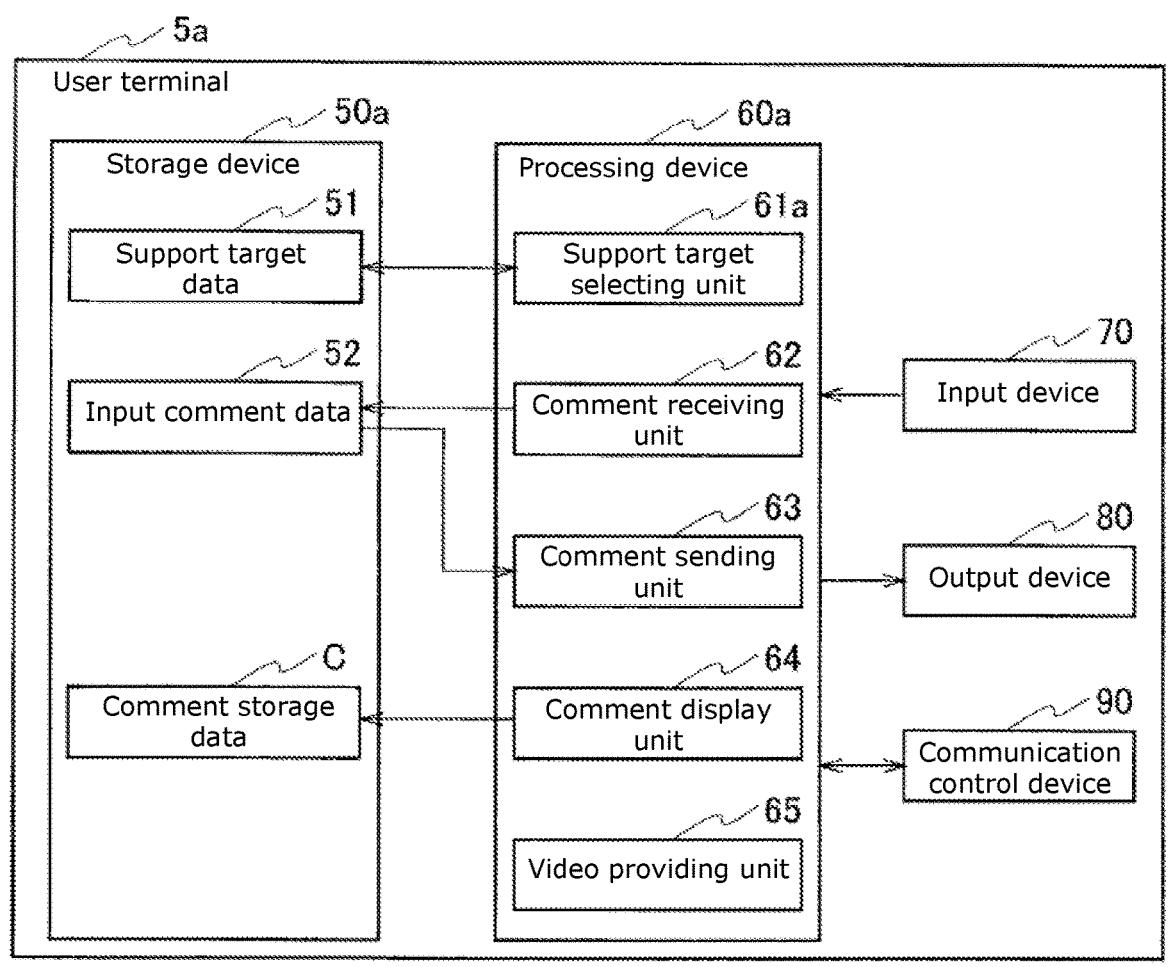

[FIG. 12]
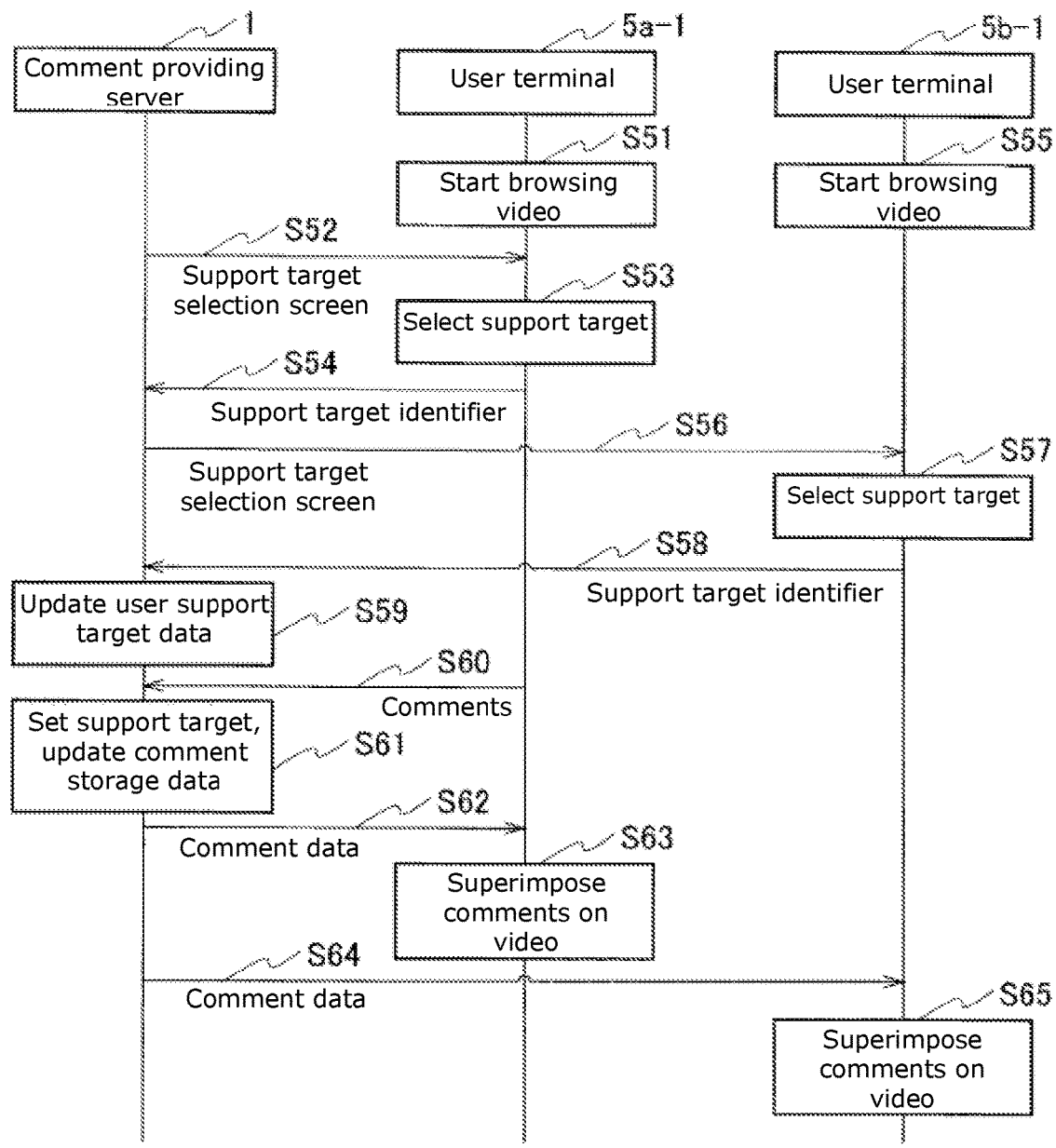

[FIG. 13]
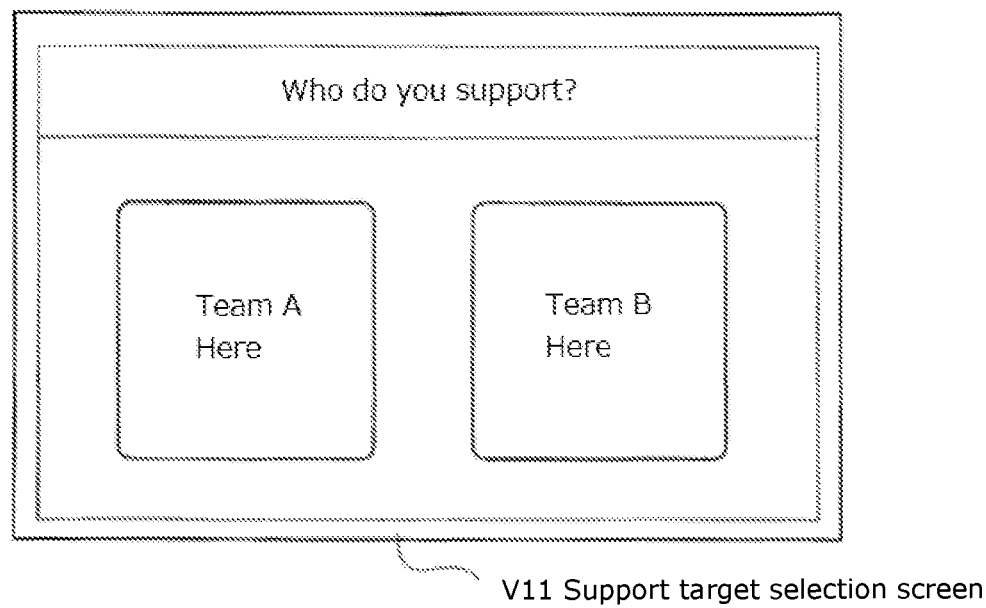
V11 Support target selection screen

POST PROVIDING SERVER, POST PROVIDING PROGRAM, USER PROGRAM, POST PROVIDING SYSTEM, AND POST PROVIDING METHOD

TECHNICAL FIELD

The present invention relates to a post providing server, post providing program, user program, post providing system, and post providing method.

BACKGROUND ART

Services are known in which video data is distributed and comments are posted by users on the distributed video data. Content in which a plurality of targets appears such as baseball games, singing contest programs with several people, and a travel program with multiple travel destinations is sometimes distributed as video data.

There is a method in which identifiers are assigned to content in which a plurality of targets appears to indicate a comment is for a certain target every time a user inputs a comment (see Patent Document 1). In the method described in Patent Document 1, a user selects an identifier for a target appearing in video data and inputs a comment on a user terminal. The comments inputted by each user are displayed in the color corresponding to the selected identifier. Patent Document 1 can be used to clearly indicate that a comment is in regard to a certain target among a plurality of targets appearing in video data.

Sometimes comments on targets appearing in competitions and public spectacles in real time are browsed by a plurality of viewers. Users who support a certain target can support that target together and browse through content from users supporting rival targets. By browsing through content in real time together with other users supporting a target, content is browsed through with greater enthusiasm and a sense of solidarity can be created.

CITATION LIST

Patent Literature

Patent Document 1: JP 2017-016535 A

SUMMARY OF INVENTION

Technical Problem

However, the technology described in Patent Document 1 only indicates the target of each comment and is not especially good for supporting a target together. Even though users supporting the same target can share a sense of solidarity while viewing a competition or public spectacle, a sense of rivalry cannot be created with users who support another target.

Therefore, it is an object of the present invention to provide a post providing server, post providing program, user program, post providing system, and post providing method that is able to create a sense of solidarity and rivalry among users viewing content in which a plurality of targets appears.

Solution to Problem

In order to solve this problem, a first aspect of the present invention relates to a post providing server comprising: a post receiving unit for receiving posted data related to content data in which a plurality of targets appears from a user terminal; and a post output unit for outputting the posted data in a display format for the target corresponding to the user of the user terminal from among the plurality of targets.

This may include a user support target determining unit for displaying a selection screen for selecting any of the plurality of targets on the user terminal and setting the selected target as the target corresponding to the user.

The user support target determining unit may display the selection screen immediately after content data has been outputted to the user terminal.

The user support target determining unit may also display the selection screen before the content data is outputted.

The user support target determining unit may be controlled depending on the target to output content data corresponding to the target selected on the selection screen.

The user support target determining means may repeatedly display the selection screen on a predetermined timing and display posted data in the display format corresponding to the changed target when the target corresponding to the user has been changed.

The display format may include or one or more of the color, darkness and size of posted data, the speed or direction of posted data, symbols or characters added to the text in posted data, and a display area for posted data, or hide posted data.

A second aspect of the present invention relates to a post providing program causing a computer to function as: a post receiving unit for receiving posted data related to content data in which a plurality of targets appears from a user terminal; and a post output unit for outputting the posted data in a display format for the target corresponding to the user of the user terminal from among the plurality of targets.

A third aspect of the present invention relates to a user program causing a computer to function as: a post receiving unit for receiving posted data related to content data in which a plurality of targets appears from an input device and sending the posted data to a post providing server; and a post display unit for displaying on the computer posted data received from the post providing server in a display format for the target corresponding to the user among the plurality of targets.

A fourth aspect of the present invention relates to a post providing system comprising a user terminal and a post providing server. In the post providing system in the fourth aspect of the present invention, the user terminal comprises a post receiving unit for receiving posted data related to content data in which a plurality of targets appears and sending the content data to a post providing server, and a post display unit for displaying the posted data in a display format for the target corresponding to the user among the plurality of targets; and the post providing server comprises a post receiving unit for receiving from the user terminal posted data related to content data in which a plurality of targets appears, and a post output unit for outputting posted data in a display format for the target corresponding to the user terminal among the plurality of targets.

A fifth aspect of the present invention relates to a post providing method used in a post providing system comprising a user terminal and a post providing server. The method in the fifth aspect of the present invention comprises: a step in which a user terminal receives posted data related to content data in which a plurality of targets appears from an input device and sends the posted data to a post providing server; a step in which the post providing server receives the posted data related to content data in which a plurality of targets appears from the user terminal; a step in which the post providing server sends posted data to the user terminal; and a step in which the user terminal displays the posted data received from the post providing server in a display format based on the target corresponding to the user of the user terminal among the plurality of targets.

Advantageous Effects of Invention

The present invention is able to provide a post providing server, post providing program, user program, post providing system, and post providing method that is able to create a sense of solidarity among users viewing content in which a plurality of targets appears.

BRIEF DESCRIPTION OF DRAWINGS

FIG. 1 is a schematic diagram of a comment providing system in an embodiment of the present invention.

FIG. 2 is a diagram used to explain the hardware configuration and function blocks of the comment providing server in the embodiment of the present invention.

FIG. 3 is a table used to explain an example of a data structure for comment storage data in the embodiment of the present invention.

FIG. 4 is a diagram used to explain the hardware configuration and function blocks of the user terminal in the embodiment of the present invention.

FIG. 5 is an example of a support target selection screen displayed on a user terminal in the embodiment of the present invention.

FIG. 6 is an example of a comment display screen displayed on a user terminal in the embodiment of the present invention.

FIG. 7 is a diagram used to explain a display area divided by support targets in a comment display screen displayed on a user terminal in the embodiment of the present invention.

FIG. 8 is a sequence diagram used to explain the comment providing method in the embodiment of the present invention.

FIG. 9 is a diagram used to explain the hardware configuration and function blocks of the comment providing server in a first modified example.

FIG. 10 is a diagram used to explain an example of a data structure for user support target data in the first modified example.

FIG. 11 is a diagram used to explain the hardware configuration and function blocks of a user terminal in the first modified example.

FIG. 12 is a sequence diagram used to explain the comment providing method in the first modified example.

FIG. 13 is an example of a support target selection screen displayed on a user terminal in a second modified example.

DESCRIPTION OF EMBODIMENTS

The following is a description of an embodiment of the present invention with reference to the drawings. In the description of the drawings, identical or similar components are denoted by identical or similar reference numbers.

In the embodiment of the present invention, a "comment" is data inputted in order to communicate with other users. A "comment" is sometimes referred to as a "post".

In the embodiment of the present invention, "real time" does not refer to the exact moment in the strict sense of the term but allows for delays in transmission and processing by each device performed as quickly as possible.

Embodiment

The following is a description of the comment providing server (post providing server) 1, user terminal 5-1, and user terminal 5-2 in the embodiment of the present invention with reference to FIG. 1. The comment providing server 1, user terminal 5-1, and user terminal 5-2 are used in the comment providing system (post providing system) 8. The comment providing system 8 also includes a video distributing server (content providing server) 2. The comment providing server (post providing server) 1, user terminal 5-1, and user terminal 5-2 are communicably connected to each other via a communication network 6 such as the internet.

In the embodiment of the present invention, user terminal 5-1 and user terminal 5-2 are sometimes referred to collectively as the user terminals 5. The comment providing system 8 in FIG. 1 has two user terminals 5. However, the system may have one or three or more user terminals 5 as well.

The comment providing server 1 distributes comment (posted) data inputted by user terminals 5 to each user terminal 5. The comment providing server 1 manages comment data collected from each user terminal 5 for each video, and distributes comment data related to these videos to each user terminal 5 viewing the videos.

The video distributing server 2 distributes video data to user terminals 5. The video distribution server 2 may distribute video data to user terminals 5 all at once in real time or may distribute previously recorded video data to user terminals 5 on demand.

A user terminal 5 outputs video data distributed by the video distributing server 2 for a user to view. The user terminal 5 also sends comment data on the video data being viewed to the comment providing server 1 and receives comment data inputted by each user terminal 5 from the comment providing server 1. The user terminal 5 may superimpose and display received comment data on the video data or display the comment data in a separate area from the video data. When the user terminal 5 superimposes comment data on the video data, it may be displayed so as to scroll in a certain direction such as from left to right on the video data.

In the description of the embodiment of the present invention, the content viewed by the user is a video but the content is not limited to video. For example, users may comment on music or still images or may comment on a television program or radio program while it is being broadcast.

In the embodiment of the present invention, the video distributing server 2 is distributing video data (content) in which a plurality of targets appears. When the video data is a sporting competition such as a baseball game, the "targets" are the teams playing against each other. When the video data is a music program in which a plurality of individuals or groups appears, the "targets" are individuals or groups or individuals belonging to groups. When the video data is a program introducing something such as travel destinations, foods or consumer goods, the "targets" are the travel destinations, foods or consumer goods being introduced. When the video data is a discussion occurring in, for example, the National Diet, the "targets" may be the diet members or parties holding the discussion.

The comment providing system 8 in the embodiment of the present invention preferably allows users of the user terminals 5 to comment on any of the targets appearing in the video data. The comments inputted by each user are displayed in a display format for the target favored by the user among the plurality of targets appearing in the video data. The comments of each user displayed on user terminals 5 are displayed in different display formats depending on the target favored by each user so that comments in a given display format favor the same target.

Even when video data is viewed remotely by each user via a communication network 6, the comments inputted by each user are displayed in the display format based on the target favored by each user. Users favoring the same subject can support the target together and share a rivalry with users supporting targets other than the one that they favor. By viewing video in real time together with other users supporting a given target, content is browsed through with greater enthusiasm and a sense of solidarity can be created.

(Comment Providing Server)

The following is an explanation of the comment providing server 1 in the embodiment of the present invention with reference to FIG. 2. The comment providing server 1 is a general-purpose computer equipped with a storage device 10, a processing device 20, and a communication control device 30. Each function shown in FIG. 2 is realized by executing a program for realizing certain functions. The communication control device 30 is an interface connecting the comment providing server 1 to the communication network 6.

The storage device 10 stores a program for realizing certain function and data inputted by the processing device 20. The storage device 10 stores comment storage data C.

Comment storage data C is data in which comments inputted by users is stored. Comment storage data C, as shown in FIG. 3, is data associated with comment identifiers, times, comment details, and user support targets. In the comment storage data C, each comment sent from a user terminal 5 is associated with a comment identifier and stored. In the embodiment of the present invention, each record constituting the comment storage data C is referred to as comment data.

A "comment identifier" is an identifier used to identify each comment inputted by users. The "time" indicates the time at which a user inputted the comment. For example, it indicates the time in the timeline of the video data viewed by the user. A "comment detail" is comment information inputted by a user. A "user support target" is an identifier for a target supported by the user inputting the comment among the targets appearing in the video data.

The processing device 20 inputs and outputs data stored by the storage device 10 and executes certain programs. The processing device 20 includes a comment receiving unit 21 and a comment output unit 22.

The comment receiving unit 21 receives from a user terminal 5 comment data related to video data (content data) in which a plurality of targets appears. In the embodiment of the present invention, comment data includes time data when the comment was inputted, comment details inputted by the user, and an identifier for the target favored by the user inputting the comment data.

When comment data is received by the comment receiving unit 21 from a user terminal 5, a comment identifier identifying the received comment data is assigned, the assigned comment identifier is associated with the received comment data, and the comment data is stored in the comment storage data C.

The comment output unit 22 sends comment data to a user terminal 5. The comment output unit 22 sends comment data in the comment storage data C to a user terminal 5 so that the comment data is displayed on the user terminal 5 in accordance with the timeline of the video being distributed by the video distributing server 2.

When video data is being distributed to user terminals 5 in real time during a live broadcast, the comment output unit 22 promptly distributes comment data received by the comment receiving unit 21 to each user terminal 5. When comment data is related to a previously recorded video, the comment output unit 22 may send all comment data related to the video regardless of the timeline and each comment may be displayed at the indicated time on the user terminal 5. The comment output unit 22 may take into account communication delays between the comment providing server 1 and the user terminal 5 and send comment data related to the video a bit ahead of the timeline indicated in a video being played back.

(User Terminal)

The following is an explanation of a user terminal 5 in the embodiment of the present invention with reference to FIG. 4. The user terminal 5 is a general-purpose computer equipped with a storage device 50, a processing device 60, an input device 70, an output device 80, and a communication control device 90. Each function shown in FIG. 4 is realized by executing a program for realizing certain functions in the general-purpose computer.

The input device 70 is a device such as a keyboard or mouse used to input user commands to the user terminal 5. The output device 80 is a display device used to display the output from the processing device 60 to the user of the user terminal 5. The input device 70 and output device 80 do not have to be housed in separate cases. The input device 70 and the output device 80 may also be realized in the same device such as a touch panel. The communication control device 90 is an interface used to connect the user terminal 5 to the communication network 6.

The storage device 50 stores a program for realizing certain function and data inputted by the processing device 60. The storage device 50 stores support target data 51, input comment data 52, and comment storage data C.

Support target data 51 is an identifier for the target supported (favored) by the user of the user terminal 5 among the plurality of targets appearing in a video.

Input comment data 52 is a series of character strings inputted into, for example, a text box by the user of the user terminal 5. For example, after the user has commented, the user inputs a send command to generate input comment data 52. The generated input comment data 52 is then stored temporarily in the storage device 50 and sent to the comment providing server 1.

The comment storage data C is data received by the user terminal 5 from the comment providing server 1. Comment storage data C, as shown in FIG. 3, is data associated with comment identifiers, times, comment details, and user support targets.

The processing device 60 inputs and outputs data stored by the storage device 50 and executes certain programs. The processing device 60 includes a support target selecting unit 61, a comment receiving unit 62, a comment sending unit 63, a comment display unit 64, and a video providing unit 65.

The support target selecting unit 61 is used by the user of the user terminal 5 to select which of a plurality of targets appearing in a video to support (or favor). The support target selecting unit 61 displays a selection screen for selecting one of a plurality of targets appearing in a video, and the selected target becomes the target corresponding to the user. At this time, the support target selecting unit 61 displays an identifier such as the name of the target on the output device 80, and the user selects the supported target using the input device 70. The support target selecting unit 61 stores the identifier for the target selected by the user in the storage device 50 as support target data 51.

The support target selecting unit 61 may display a selection screen based on an instruction from the comment providing server 1 or may be displayed autonomously. When displayed autonomously the support target selecting unit 61 identifies the plurality of targets appearing in the video from metadata associated with the video and displays a screen enabling the user to select an identified target.

In the embodiment of the present invention, the support target selecting unit 61 displays the selection screen immediately after video data acquired from the video distributing server 2 has been outputted. By displaying the selection screen immediately after video data has been outputted, the user can enjoy the content more having selected a target to favor before viewing the video data.

For example, when an initial number of frames of video data has been displayed, the support target selecting unit 61 superimposes a support target selection screen V1 for selecting a target to support on the screen as shown in FIG. 5. When the video is a baseball game played between Team A and Team B, the screen asks the user "Who do you support?" and displays a virtual button for selecting Team A and a virtual button for selecting Team B.

At this time, the support target selection screen V1 may be superimposed over video data obtained from the video distributing server 2 as shown in FIG. 5 or may be displayed over a temporarily stopped still image of the video data. The support target selection screen V1 may also be displayed on a blank screen unrelated to the video data.

When the user has pressed the virtual button for Team A or Team B, the support target selecting unit 61 stores the identifier for the target selected by the user in the storage device 50 as support target data 51. The support target selection screen V1 then disappears and video obtained from the video distributing server 2 is played.

The comment receiving unit 62 receives from the input device 70 comment data related to the video data in which a plurality of targets appears. The comment receiving unit 62 inputs comments on the video distributed by the video distributing server 2 to the user of the user terminal 5, and the comment data is stored in the storage device 50 as input comment data 52. For example, a text box and a send button are displayed on the output device 80 and comment information is inputted in the text box via the input device 70. When the user selects (presses) the send button, the comment receiving unit 62 obtains the information inputted to the text box and generates input comment data 52.

The comment sending unit 63 sends the input comment data 52 to the comment providing server 1. In the embodiment of the present invention, the comment sending unit 63 also sends support target data 51 to the comment providing server 1 every time input comment data 52 is sent.

The comment display unit 64 displays comment data received from the comment providing server 1 in the display format for the target corresponding to the user of the user terminal 5 among the plurality of targets. In the embodiment of the present invention, the comment display unit 64 stores the comment data received from the comment providing server 1 in the comment storage data C and displays the comment data on the output device 80.

The comment display unit 64 changes the details and display format of the comment data included in the comment storage data C based on the identifier for the support target of the user in the comment data before displaying the comment data. Here, the user terminal 5 holds a table including support target identifiers and the display formats corresponding to the identifiers. The display format corresponding to the identifier of the support target associated with the comment details to be displayed is acquired from the table and the comment details are displayed in the acquired display format. The table may be prepared individually by the user or may be distributed by the comment providing server 1.

Here, the display format for comments includes the color, darkness and size of posted data, the speed or direction of posted data, symbols or characters added to the text in posted data, and a display area for posted data. The comment display format may also hide comment data related to targets other than the supported target selected by the user of the user terminal 5.

For example, in a video of a baseball game played between Team A and Team B, comments inputted by users supporting Team A are displayed in bold characters and comments inputted by users supporting Team B are displayed in normal characters as shown in the comment display screen V2 in FIG. 6. The comment display screen V2 in FIG. 6 is a screen displayed on the user terminal 5 of a user supporting Team A. The comment display screen V2 emphasizes comments from users supporting Team A and de-emphasizes comments from users supporting Team B so that a user supporting Team A has a sense of solidarity with other users supporting Team A.

When comments related to the same video data are displayed on the user terminal 5 of a user supporting Team B, comments from users supporting Team B may be emphasized using bold characters and comments from users supporting Team A may be de-emphasized using normal characters.

The comment display unit 64 changes the display format based on the support target so that the user inputting comments knows who supports which target simply by glancing at the display comments.

The video providing unit 65 outputs video data (content data) 53 obtained from the video distributing server 2 to the output device 80. The video providing unit 65 may suspend playback or display a blank screen while the support target selecting unit 61 displays the support target selecting screen V1.

The following is a more detailed explanation of the comment display format. In this explanation, two targets appear in the video data, Target A and Target B.

(1) Color of Comment Data The comment display unit 64 displays comments inputted by users supporting Target A in red and comments by users supporting Target B in blue.

(2) Darkness and Size of Comment Data

The comment display unit 64 displays comments inputted by users supporting the same target as the user of the user terminal 5 using darker or larger characters. It also displays comments inputted by users supporting the target different from the user of the user terminal 5 using lighter or smaller characters.

(3) Speed or Direction of Comment Data

The comment display unit 64 displays comments inputted by users supporting Target A from left to right over the video data and displays comments inputted by users supporting Target B from top to bottom over the video data. The comment display unit 64 also displays comments inputted by users supporting the same target as the user of the user terminal 5 at a slower speed and displays comments inputted by users supporting the target different from the user of the user terminal 5 at a faster speed.

(4) Symbols or Characters Added to Text in the Comment Data

The comment display unit 64 adds a specific symbol or character such as "★" in front of comments inputted by users supporting Target A and adds a specific symbol or character other than "★" such as "■" in front of comments inputted by users supporting Target B. Instead of symbols, certain expressions or exclamations can be added to comments depending on the target being supported.

(5) Amount of Comment Data

The comment display unit 64 changes the proportion of comments screened by target. For example, the screen of the user terminal 5 of a user supporting Team A screens comments so that there are more comments by users supporting Team A and fewer comments by users supporting Team B.

(6) Comment Data Display Area

The comment display unit 64 divides the area for displaying comments in half and displays comments inputted by users supporting Target A and comments inputted by users supporting Target B in separate sections.

For example, as shown in FIG. 7, the comment display screen V3 is provided with a Team A supporting users comment display section V3a for displaying comments from users supporting Team A and a Team B supporting users comment display section V3b for displaying comments from users supporting Team B. In the example shown in FIG. 7, the supported targets have display areas of similar size. However, display areas of different sizes may be provided depending on the supported target. For example, on the user screen of a user supporting Team A, the Team A supporting users comment display section V3a may be wider and the Team B supporting users comment display section V3b may be narrower.

(7) Hiding Comment Data

The comment display unit 64 may perform controls so that comments by users supporting the target other than the target supported by the user of the user terminal 5 are not displayed. In this way, the comment display unit 64 allows the user of the user terminal 5 to view only comments from users supporting the target supported by the user.

The display format may combine any of (1) through (7) above as long as they are non-contradictory. For example, when the display area is divided by supported target as shown in FIG. 7, the color, darkness and size of the comment data may be changed as indicated in (1) to (5) above.

(Comment Providing Method)

The following is an explanation of the comment providing method (post providing method) in the embodiment of the present invention with reference to FIG. 8. In the explanation of the example shown in FIG. 8, predetermined video data is distributed in real time to user terminal 5-1 and user terminal 5-2, and comments inputted by user terminal 5-1 are shared with other user terminals 5.

First, in Step S1, user terminal 5-1 outputs video data obtained from the video distributing server 2 to the output device 80 and the user begins to view the video data. The comment providing server 1 is notified that the user has begun to view the video data and, immediately before the user begins viewing the video data, the comment providing server 1 displays the support target selection screen V1 shown in FIG. 5 on the user terminal 5-1 in Step S2. The user terminal 5-1 may display the support target selection screen V1 autonomously and not under the control of the comment providing server 1. When in Step S3 the user of the user terminal 5 has selected a support target, the user terminal 5 stores the identifier for the selected support target in the storage device 50 as support target data 51.

In Steps S4 to S6, the processing in Steps S1 to S3 is performed by the user terminal 5-2.

Here, the user of user terminal 5-1 wishes to input a comment on the video. At this time, in Step S7, the user terminal 5-1 sends the comment inputted by the user and the support target identifier stored in Step S3 to the comment providing server 1. In Step S8, the comment providing server 1 associates the comment received in Step S7 with the target support identifier and updates the comment storage data C.

Afterwards, in Step S9, the comment providing server 1 sends the comment data sent in Step S7 to the user terminal 5-1. In Step S10, the user terminal 5-1 superimposes the comment received in Step S9 on the video started in Step S1. Similarly, in Step S11, the comment providing server 1 sends the comment data sent in Step S7 to user terminal 5-2. In Step S12, the user terminal 5-2 superimposes the comment received in Step S11 on the video started in Step S4.

In the embodiment of the present invention, the display format for each user is set based on the target supported by each user so that the user can determine whether or not another user supports the same target by viewing the comment display format. In this way, users who support the same target can support the target together via comments. When a competition or public spectacle is being viewed in real time, this can provide a sense of solidarity.

By modifying and dividing comments by supported targets, a user viewing the video can send and receive comments to foster a sense of rivalry among users divided by target and inspire users supporting the same target. The comment providing method in the embodiment of the present invention thus provides an attractive platform for sharing interests with other users by viewing video content together and exchanging comments.

In the embodiment of the present invention, users are asked which target they support immediately after starting to view a video. In this way, users can view the video from the standpoint of their supported target. This can increase interest and enjoyment in the video being viewed.

Even when users do not support a particular target, they can enjoy the company of other users by selecting a target to support provisionally.

1st Modified Example

A first modified example will now be described with reference to FIG. 9 to FIG. 12. In the embodiment of the present invention, the comment data included comments inputted from user terminals 5 and identifiers for the target favored by the user inputting the comment. In the first modified example, the comment data includes an identifier for the target being favored and an identifier for the user.

The comment providing server 1a in the first modified example shown in FIG. 9, unlike the comment providing server 1 shown in FIG. 2, has a storage device 10a including user support target data 24 and a processing device 20a including a user support target determining unit 23. The processing performed by the comment output unit 22 is also different.

As shown in FIG. 10, the user support target data 24 is data associated with a user identifier and a user support target. The "user identifier" is an identifier used by the comment providing server 1a to identify a user and can be a user ID or IP address. A "user support target" is an identifier for the target selected by a user among a plurality of targets appearing in video data.

The user support target determining unit 23 displays the selection screen for selecting one of a plurality of targets on the user terminal 5, and the selected target becomes the target corresponding to the user. The user support target determining unit 23 obtains the user identifier and the user support target identifier from the user terminal 5 and stores them in the user support target data 24.

The user support target determining unit 23 displays the selection screen immediately after the video data has been outputted to the user terminal 5. The user support target determining unit 23 is notified by the video distributing server 2 or the user terminal 5 that the video data has been outputted on the user terminal 5, and the screen enabling the user to select a favored target is immediately displayed on the user terminal 5. When the target favored by the user is selected, the user support target determining unit 23 acquires the user identifier and the user support target identifier from the user terminal 5 and updates the user support target data 24.

In some situations, the screen enabling a user to select a favored target is not displayed on the user terminal 5 by the user support target determining unit 23. For example, the screen for selecting a favored target may be displayed on the user terminal 5 and the identifier for the favored target selected by the user sent to the comment distributing server 1a autonomously and not under the command of the comment providing server 1a. The user support target determining unit 23 updates the user support target data 24 based on the information received from the user terminal 5.

When comment data is outputted to a user terminal 5, the comment output unit 22 references the user support target data 24 and adds the identifier for the target supported by the user inputting the comment.

The user terminal 5a related to the first modified example shown in FIG. 11 has a support target selecting unit 61a that performs different processing than the one in the user terminal 5 shown in FIG. 4.

After the user of the user terminal 5 has selected which target to support (favor) among the plurality of targets appearing in the video, the support target selecting unit 61a sends the user identifier and the identifier for the selected support target to the comment providing server 1a.

The following is an explanation of the comment providing method in the first modified example with reference to FIG. 12.

First, in Step S51, the user terminal 5-1 outputs video data obtained from the video distributing server 2 to the output device 80 and the user starts to view the video data. The comment providing server 1 is notified that the user has begun to view the video data and, immediately before the user begins viewing the video data, the comment providing server 1 displays the support target selection screen V1 shown in FIG. 5 on the user terminal 5-1 in Step S52. When in Step S53 the user of the user terminal 5 has selected a support target, the user terminal 5 sends the identifier for the selected support target to the comment providing server 1.

In Steps S55 to S58, the processing in Steps S51 to S54 is performed by the user terminal 5-2. In Step S59, the comment providing server 1 associates the support target identifiers received in Step S54 and Step S58 with the identifiers of each user and updates the user support target data 24.

Here, the user inputs a comment on the video in the user terminal 5-1. At this time, the user terminal 5-1 in Step S60 sends the comment inputted by the user and the user identifier for the user to the comment providing server 1. The comment providing server 1 in Step S61 identifies the supported target identifier from the user identifier received in Step S60 and updates the comment storage data C.

The processing in Steps S62 to S65 is then performed as explained with reference to Step S9 to Step S12 in FIG. 8.

2nd Modified Example

In the explanation of the embodiment of the present invention, the comment providing server 1 or user terminal 5 displayed the selection screen enabling the user to select a support target immediately after the video data acquired from the video distributing server 2 was outputted by the user terminal 5. However, the present invention is not limited to this embodiment.

In the second modified example, the comment providing server 1 or the user terminal 5 displays the selection screen and determines the support target of the user before content data is outputted. Here, the selection screen can be displayed in the second modified example at any time prior to the user viewing the video data.

For example, the user may display the user screen when registering as a member to use the comment providing system 8. The selection screen can take the form of a questionnaire for the user to fill out. The user terminal 5 or comment providing server 1 can determine the target supported by the user from user answers in the questionnaire.

When the user has viewed the same type of video in the past, the target selected by the user at that time can be used as the support target in the video about to be viewed. For example, when a user selected Team A as the support target in the video of a baseball game between Team A and Team B in the past, Team A can be set as the support target when video of a new baseball game between Team A and Team B is viewed by the user without displaying the screen for selecting a support target on the user terminal 5 again.

The selection screen can also be displayed immediately after the user selects a video to watch but before the video is displayed.

Working with the video distributing server 2, a screen enabling a user to select a video to view can be combined with a screen enabling the user to select a target. Preferably, the video data differs depending on the target. The comment providing server 1 or user terminal 5 displays a link on the user terminal 5 to video data that differs by target. The comment providing server 1 or user terminal 5 then performs controls to output content data based on the target selected using the selection screen.

Specifically, the comment providing server 1 displays the support target selection screen V11 shown in FIG. 13 on the user terminal 5. This support target selection screen V11 includes virtual buttons for watching a video for each target. When the virtual button corresponding to the target supported by the user has been selected, the comment providing server 1 or user terminal 5 notifies the video distributing server 2 of the identifier for the video data selected by the user and the user terminal 5 is used to input comments. In this way, the user terminal 5 can be used to view video data and input comments.

The display format of the video data changes depending on the target appearing in the video and comments inputted by each user are displayed. For example, comments by users supporting the target supported by the user are displayed in bold text and comments by users supporting the target not supported by the user are displayed in normal text.

In the second modified example, unlike the embodiment of the present invention and the first modified example, the user does not send an identifier for the target supported by the user or a user identifier each time the user sends a comment. In the second modified example, content for each supported target can be added to video data or comments.

3rd Modified Example

When specific video data is being viewed, a screen for selecting the target supported by the user can be outputted several times. The comment providing server 1 or user terminal 5 repeats the processing for displaying the selection screen at predetermined intervals. When the target corresponding to the user has been changed, comment data for the user is displayed in the display format of the changed target.

For example, several targets may oppose each other in a session of the National Diet or during a debate, and the user may wish to change the supported target in each case. The comment providing server 1 or user terminal 5 may display a screen on the user terminal 5 at predetermined intervals during a video to ask users whether they wish to change support targets.

When the support target is changed while viewing video, the comments inputted by the user are displayed in the display format of the changed support target. For example, comments on the support target prior to the change may be displayed in red and comments for the support target after the change may be displayed in blue.

Also, comments on a predetermined support target can be divided so that, for example, comments inputted by users who selected a support target at the start are separated from comments inputted by users who changed their support target while watching. For example, comments inputted by users who selected a support target at the start may be displayed in blue and comments inputted by users who changed their support target while watching are displayed in blue but underlined. In this way, users wondering who to select can see changes in support by noting comments by users who have changed their support.

4th Modified Example

In the explanation provided above, users expressly selected support targets. However, the present invention is not limited to this.

For example, when a selection has not been made after the target selection screen has been displayed for a predetermined amount of time, the user terminal 5 or comment providing server 1 may arbitrarily decide which target is supported by the user. Comments inputted by the user are then displayed in the display format corresponding to the selected target. In this way, users who have not decided who to support can enjoy the company of other users. Because a feeling of support for the target can be expected to grow, user interest in content may increase.

A user may also view a video and input comments without selecting a target to support. The comments inputted by users who have not selected a target to support may be displayed in a display format that differs from the display format of comments entered by users who have selected a target to support.

OTHER EMBODIMENTS

The present invention was described with reference to an embodiment and four modified examples. However, it should be understood that the present invention is not limited to the partial disclosure explained or depicted herein. It should be clear to those skilled in the art that other examples, modifications, and technological improvements are possible without departing from what has been disclosed.

For example, the comment providing server described in the embodiment of the present invention may be configured as a single unit of hardware as depicted in FIG. 2 or as separate units of hardware for the various functions and processes. It may also be realized in an existing comment providing system.

The present invention naturally includes a wide variety of embodiments not described herein. Therefore, the technical scope of the present invention in the description above is determined only by the appropriate invention-specifying matters in the claims.

REFERENCE SIGNS LIST

1: Comment providing server
2: Video distributing server
5: User terminal
6: Communication network
8: Comment providing system
10, 50: Storage device
20, 60: Processing device
21: Comment receiving unit
22: Comment output unit
23: User support target determining unit
24: User support target data
30, 90: Communication control device
51: Support target data
52: Input comment data
53: Content data
61: Support target selecting unit
62: Comment receiving unit
63: Comment sending unit
64: Comment display unit
65: Video providing unit
70: Input device
80: Output device
C: Comment storage data

The invention claimed is:

1. A post providing server comprising:
a post receiving unit configured to receive, from a user terminal, posted data related to content data in which a plurality of targets appear;
a post output unit configured to output, to a user of the user terminal, the posted data in a display format for a target from among the plurality of targets; and
a user support target determining unit configured to display a selection screen,
wherein the selection screen is configured to allow the user to select the target from the plurality of targets through a questionnaire, and the plurality of targets is supported by content data displayed by the user terminal,
wherein when the user support target determining unit is configured to store the target selected by the user, and the target is stored, the selection screen is not displayed multiple times,
wherein posted data supporting the target is displayed on the user terminal in larger characters than characters of other posted data supporting other targets from the plurality of targets, wherein the posted data supporting the target is intermixed with the other posted data supporting other targets from the plurality of targets, wherein the other posted data supporting other targets from the plurality of targets is displayed less frequently than the posted data supporting the target, and wherein the content data is distributed to the user terminal in real-time by live broadcast.

2. A post providing server according to claim 1, wherein the user support target determining unit is configured to display the selection screen immediately after content data has been outputted to the user terminal.

3. A post providing server according to claim 1, wherein the user support target determining unit is configured to display the selection screen before the content data is outputted.

4. A post providing server according to claim 3, wherein the user support target determining unit is configured to be controlled depending on the target, to output content data corresponding to the target selected on the selection screen.

5. A post providing server according to claim 1, wherein the user support target determining unit is configured to repeatedly display the selection screen on a predetermined timing and is configured to display posted data in the display format corresponding to the changed target when the target corresponding to the user has been changed, wherein the display format includes a change in proportion of posted data supported by the target to other posted data supporting other targets from the plurality of targets.

6. A post providing server according to claim 1, wherein the display format includes one or more of a color, darkness, and size of posted data, a speed or direction of posted data, and symbols or characters added to text in posted data.

7. A post providing program causing a computer to function as:

a post receiving unit configured to receive, from a user terminal, posted data related to content data in which a plurality of targets appears;

a post output unit configured to output, to a user of the user terminal, the posted data in a display format for a target from among the plurality of targets, a user support target determining unit configured to display a selection screen, wherein the selection screen is configured to allow the user to select the target from the plurality of targets through a questionnaire, and the plurality of targets is supported by content data displayed by the user terminal, wherein when the user support target determining unit is configured to store the target selected by the user, and the target is stored, the selection screen is not displayed multiple times, wherein posted data supporting the target is displayed on the user terminal in larger characters than characters of other posted data supporting other targets from the plurality of targets, wherein the posted data supporting the target is intermixed with the other posted data supporting other targets from the plurality of targets, wherein the other posted data supporting other targets from the plurality of targets is displayed less frequently than the posted data supporting the target, and wherein the content data is distributed to the user terminal in real-time by live broadcast.

8. A user program causing a computer to function as:

a post receiving unit configured to receive posted data related to content data in which a plurality of targets appear from an input device and configured to send the posted data to a post providing server;

a post display unit configured to display, on a display connected to the computer, the posted data received from the post providing server in a display format for the target corresponding to a user among the plurality of targets; and a user support target determining unit configured to display a selection screen, wherein the selection screen is configured to allow the user to select the target from the plurality of targets through a questionnaire, and the plurality of targets is supported by content data displayed by the user terminal, wherein when the user support target determining unit is configured to store the target selected by the user, and the target is stored, the selection screen is not displayed multiple times, wherein posted data supporting the target is displayed on the user terminal in larger characters than characters of other posted data supporting other targets from the plurality of targets, wherein the posted data supporting the target is intermixed with the other posted data supporting other targets from the plurality of targets, wherein the other posted data supporting other targets from the plurality of targets is displayed less frequently than the posted data supporting the target, and wherein the content data is distributed to the user terminal in real-time by live broadcast.

\* \* \* \* \*